June 16, 1942. R. B. COMINS 2,286,263
QUICK ACTING COUPLING
Filed April 25, 1939
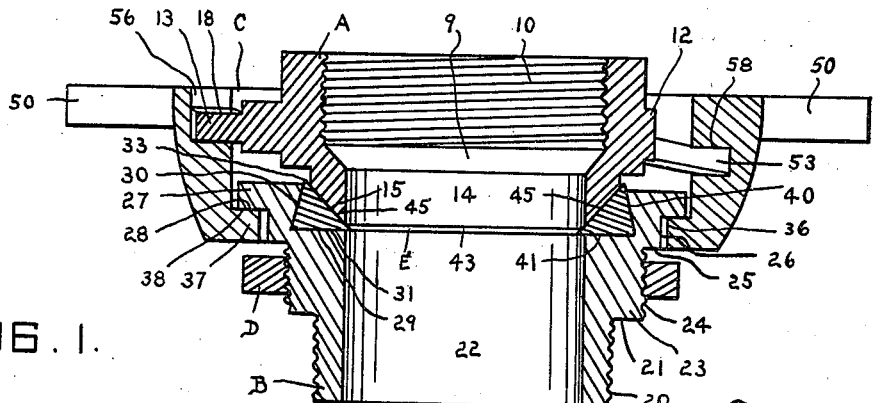
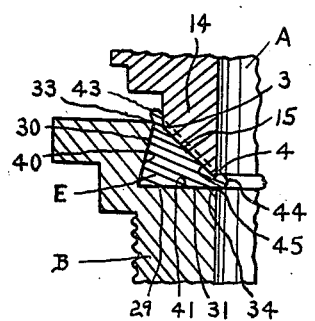
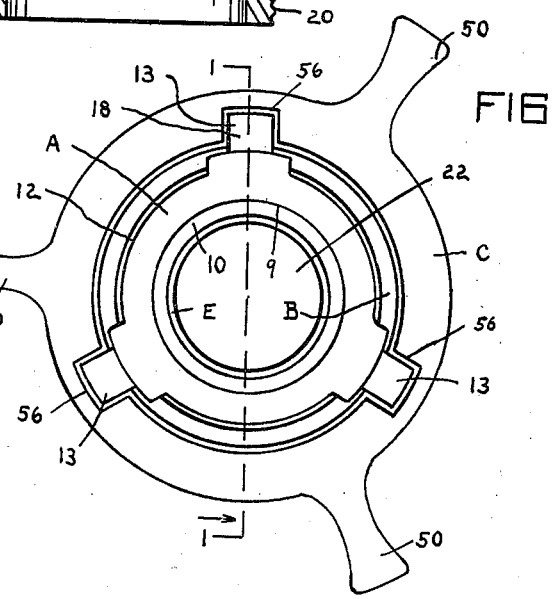
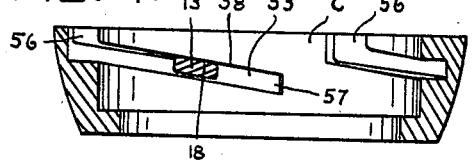
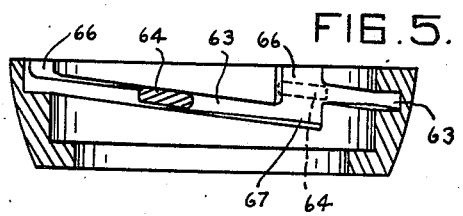
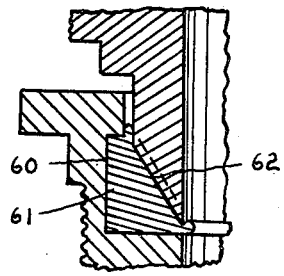
INVENTOR.
Ralph B. Comins
BY Gardner W. Pearson
ATTORNEY.

Patented June 16, 1942

2,286,263

UNITED STATES PATENT OFFICE 2,286,263

QUICK ACTING COUPLING

Ralph B. Comins, Lowell, Mass.

Application April 25, 1939, Serial No. 269,887

3 Claims. (Cl. 285—177)

This invention relates to quick acting couplings of the type in which there are two elements with a gasket between, the two elements being squeezed together and against the gasket by the partial rotation of a third element.

It is particularly useful in connection with gasoline or oil tanks which have several delivery faucets having ends of different sizes. One member of the coupling is permanently attached to the faucet and certain features of other members are preferably so standardized that such members, including a gasket carried by a movable hose, can be instantly connected.

The construction is such that leaking is prevented and wear on the gasket and other moving parts is not only reduced but when and if certain parts do wear or deteriorate, there will be no leak and the gasket can readily be replaced.

Other advantages are that the whole device is simple and inexpensive to manufacture and is sturdy enough to stand rough handling.

I am aware that numerous couplings have been patented in which there are spring-pressed tightening rings, locking tightening rings and pressure adjustable tightening rings.

A special feature of my device is the use of a gasket of triangular cross section with an interior sloping or tapering face which is engaged by substantially the whole of the annular tapered face of the fixed or male member of the coupling, the inner edge of the gasket extending into the bore of the female member so as to make a tight joint.

The gasket is thickest at the bottom where at one edge it is confined and the only places it can spread under pressure are at the top edge and the inside edge between the edges of the male end tapering face and the top and inside edges of the gasket channel. On the inside it protrudes in a ring which, being the only part exposed to the liquid, may wear more rapidly but is constantly being replaced from behind when added pressure is applied. This is an advantage because it is the action of the liquid on the material of the ordinary rubber gasket and in fact on most gaskets which disintegrates the material of the gasket.

Near its top edge, the gasket is also pinched or squeezed so that its rim protrudes and provides a second effective seal to prevent leaks.

With my construction, wear on and deterioration of the gasket will not break the fluid tight joints of the coupling, but preferably I use a gasket of a material, such as "Neoprene," which is not affected by gasoline or oil and which, while not as resilient as some forms of rubber, makes a tight joint when squeezed between my members.

This squeezing is only in an axially direction, there being no surface friction or rubbing to wear the gasket or to cause it to move circumferentially. As it is also locked in place against axial movement, it remains set and tight with its surfaces exactly fitting the contacting faces of the squeezing members until it wears out and must be replaced.

In the drawing, Fig. 1 is a sectional view of the complete assembly on the line 1—1 of Fig. 3.

Fig. 2 is a diagrammatic sectional view through the gasket and adjoining parts.

Fig. 3 is a view of the top or free end of the assembly.

Fig. 4 and Fig. 5 are diagrammatic sectional views, similar to Fig. 1, of the coupling ring removed from the assembly but showing a cross section of a lug.

Fig. 6 is a view similar to Fig. 2 of a modification.

The coupling device comprises a fixed male member A, an axially movable tubular female member B, a turnable coupling ring C, a coupling ring retaining nut D and a gasket E.

Member A has a bore 9 which extends through it, and has, at what I will call the fixed end, the interior threads 10 by which it may be attached to the faucet of a tank truck. At the fixed end, it has an outwardly extending annular flange 12 and its other end 14 is cylindrical and terminates in a tapered annular gasket face 15.

Three equally spaced lugs 13 project outwardly from flange 12. Their top or contact faces 18 preferably incline at the same angle to face 28 of a flange 27 of member B as the top face 58 of a lug channel 53 inclines to that face 28.

A greater number of lugs could be used with a corresponding increase in the number of lug channels 53, 53, 53 in coupling ring C. The annular gasket face 15 of member A is for engagement with the inside tapered face 45 of gasket member E. This face 15 is preferably of less width between its edges 3 and 4 than the width of a gasket E between its edges 43 and 44.

Female member B is tubular in shape and includes main threads 20 at one end for connection to a hose pipe. Flange 21 is provided as a stop for the hose, and annular flange 23 is formed with intermediate threads at 24 for the ring nut D.

Beyond threads 24 is an annular shoulder 25 with a cylindrical outside guiding face 26 for the inner edge 36 of retaining flange 37 of coupling ring C.

Beyond face 26 is an outwardly projecting coupling ring holding flange 27 whose face 28, which engages the turning face 38 of flange 37 of coupling ring C, is in a plane perpendicular to the axis of member B.

On the inside of member B, extending out from its bore 22, is an angular gasket channel 29. This channel has an outside inwardly tapered face 30 which slopes inward to an edge 33 and a base face 31 in a plane parallel with face 28 and which ends at an edge 34.

Gasket E has three faces, 40 which engages 30, 41 which engages 31 but is wider, and tapered face 45 which engages male gasket face 15 and extends between edges 43 and 44.

Coupling ring C has an inwardly projecting annular retaining flange 37 which keeps it in place between flange 27 and nut D.

Coupling ring C also has a number of lug channels 53, 53, 53 corresponding to the lugs 13, 13, 13.

Each lug channel 53 includes an open passage 56 for a lug from the end and a dead end passage 57 for each lug, said passage 57 having an inclined top face 58 to pull the members together.

The contacting faces 58 preferably slope or incline at a uniform angle and the parts are so arranged that when contact ring C is turned upon a fresh gasket, the union is complete before the lugs reach the dead ends of passages 57. As the gasket wears, the turn will be slightly more to take up the wear, but in any case, the parts will remain locked.

I prefer to use one or more handles 50, 50, 50 integral with coupling ring C by which it can be operated by hand to engage lug channels 53 with lugs 13.

In the preferred form, when the ring C is turned so as to pull members A and B together, the gasket face 15 of member A sinks into face 45 of gasket E so that the material at 43 and 44 spreads out, as shown in Fig. 2, creating two perfect seals.

As shown in Fig. 6, I may use a gasket 61, a cross section of which is not a true triangle but is substantially a triangle, and is so proportioned with reference to gasket channel 60 and the tapered face 62 of a male member that it is pressed out or bulges to form sealing rings at the top and bottom.

Instead of using dead end channels, such as 53, I can, as shown in Fig. 5, use channels, such as 63, in which each open passage or mouth 66 extends down to a point where the bottom of each such mouth connects with the bottom end 67 of a channel 63 with the result that a lug, such as 64, can go right through the channel and be released by the next mouth 66. This may indicate that the gasket has worn so as to become useless and that a fresh gasket is required. From the construction of the gasket channels, it is a simple matter to remove an old gasket and replace it with a new one without tools.

I claim:

1. In a quick acting coupling, the combination of a fixed male member having an annular tapered gasket face at one end, a bore extending through the gasket face and through the other end, such male member having three or more outwardly extending lugs; with a substantially tubular axially movable female member having on the outside an annular coupling ring holding flange with a face in a plane perpendicular to the axis, and on the inside a bore from which an annular gasket channel extends outwardly, said gasket channel having a base face and an outside substantially unbroken inwardly tapered face to retain a gasket; a gasket of triangular cross section, with approximately equal unbroken sides, made of compressible wear resisting material positioned in the gasket channel, having a tapered face engaging the male member tapered gasket face but of greater width than said face; and a turnable coupling ring having an annular flange extending inside the coupling ring holding flange, and outwardly extending lug channels to receive and hold the lugs, each channel including an open passage for each lug from the end and a passage having an inclined top face to pull the members together when the coupling ring is turned, whereby the gasket is squeezed axially without surface rubbing between the base face and the male member tapered gasket face.

2. In a quick acting coupling, the combination of a fixed male member having an annular tapered gasket face at one end, a bore extending through the gasket face and through the other end; with a substantially tubular axially movable female member having on the inside a bore from which an annular gasket channel extends outwardly, said gasket channel having a base face and an outside substantially unbroken inwardly tapered face to retain a gasket; a gasket of triangular cross section, with approximately equal unbroken sides, made of compressible wear resisting material positioned in the gasket channel, having a tapered face engaging the male member tapered gasket face but of greater width than said face; and a turnable coupling ring to force the male and female members together, whereby to directly compress the gasket without rubbing it.

3. In a coupling, the combination of a tubular member having on the inside a bore from which an annular gasket channel extends outwardly, said gasket channel having a base face and an outside face, both being substantially unbroken, of equal width and at substantially sixty degrees with each other to retain a gasket; a gasket of substantially triangular cross section made of compressible wear retaining material positioned in the gasket channel; and means to engage part of the free face of the gasket whereby it can be so compressed without scraping that the edges of this face protrude beyond the edges of the other faces.

RALPH B. COMINS.